United States Patent
Faerber et al.

(10) Patent No.: US 9,867,201 B2
(45) Date of Patent: Jan. 9, 2018

(54) JOINT ASSIGNMENT AND SCHEDULING FOR OVERLAPPING COMP CLUSTERS

(75) Inventors: Michael Faerber, Wolfratshausen (DE); Wolfgang Mennerich, Blaustein (DE); Wolfgang Zirwas, Munich (DE)

(73) Assignee: Nokia Solutions and Networks OY, Espoo (FI)

( * ) Notice: Subject to any disclaimer, the term of this patent is extended or adjusted under 35 U.S.C. 154(b) by 340 days.

(21) Appl. No.: 14/399,462

(22) PCT Filed: May 7, 2012

(86) PCT No.: PCT/EP2012/058345
§ 371 (c)(1),
(2), (4) Date: Feb. 19, 2015

(87) PCT Pub. No.: WO2013/167161
PCT Pub. Date: Nov. 14, 2013

(65) Prior Publication Data
US 2015/0296521 A1    Oct. 15, 2015

(51) Int. Cl.
*H04W 72/08* (2009.01)
*H04L 5/00* (2006.01)
*H04W 28/16* (2009.01)

(52) U.S. Cl.
CPC ............ *H04W 72/08* (2013.01); *H04L 5/006* (2013.01); *H04L 5/0035* (2013.01);
(Continued)

(58) Field of Classification Search
CPC ..... H04W 72/04; H04W 72/08; H04W 28/16; H04L 5/006; H04L 5/0064; H04L 5/0035; H04L 5/0057; H04B 7/024
See application file for complete search history.

(56) References Cited

U.S. PATENT DOCUMENTS

2010/0034151 A1  2/2010 Alexiou et al.
2013/0114478 A1* 5/2013 Shi .................. H04W 24/08
                                                    370/280

FOREIGN PATENT DOCUMENTS

WO    2011/054380 A1    5/2011

OTHER PUBLICATIONS

Wolfgang Zirwas, et al.; Main Enablers for Advanced Interference Mitigation; 2011 8th International Workshop on, IEEE, May 3, 2011 (May 3, 2011), pp. 1-5, XP031947913.
(Continued)

*Primary Examiner* — Paul H Masur
(74) *Attorney, Agent, or Firm* — Brake Hughes Bellermann LLP (57) ABSTRACT

The present invention provides methods, apparatuses and a computer program product related to joint assignment and scheduling for overlapping coordinated multi-point transmission (CoMP) clusters. The present invention includes acquiring, at a network entity, for each of a plurality of user equipments connected to a resource of a cooperation area, a connectivity ratio of each user equipment to the resource, selecting, at the network entity, among the plurality of user equipments connected to the resource of a cooperation area, a first user equipment having a lowest current connectivity ratio, and determining whether the current connectivity ratio of the selected user equipment is equal to or smaller than a stored connectivity ratio of the selected user equipment to another resource available for the user equipment.

16 Claims, 5 Drawing Sheets

(52) U.S. Cl.
CPC .......... *H04L 5/0057* (2013.01); *H04L 5/0064* (2013.01); *H04W 28/16* (2013.01); *H04L 5/001* (2013.01)

(56) References Cited

OTHER PUBLICATIONS

Zhao Tong, et al.; "A Novel Downlink Coordination Scheme for CoMP SU-MIMO"; 2011 International Conference on, IEEE, May 14, 2011 (May 14, 2011), pp. 121-125, XP032004165.

Xingkun Xu, et al.; "Sub-Carrier Allocation Combined with Coordinated Multi-Point Transmission in Multi-Cell OFDMA System"; International Conference on, IEEE, Piscataway, NJ, USA, Nov. 6, 2009 (Nov. 6, 2009), pp. 842-846, XP031585831.

Wolfgang Mennerich, et al.; "Implementation Issue of the Partial CoMP Concept"; 21st Annual IEEE International Symposium on Personal, Indoor and Mobile Radio Communications; Instanbul, Turkey, Sep. 2010.

Wolfgang Mennerich, et al., "Usercentric Cooperation"; In Proceedings of IEEE 72nd Vehicular Technology Conference, Sep. 2010, pp. 5.

Wolfgang Mennerich, et al.; "User Centric Scheduling in Cooperative Networks"; 2010-IEEE APS, Middle East Conference on Antennas and Propagation (MECAP),Cairo, Egypt, Oct. 20, 2010.

International Search Report for International Application No. PCT/EP2012/058345, dated Nov. 16, 2012, 4 pages.

\* cited by examiner

JOINT ASSIGNMENT AND SCHEDULING FOR OVERLAPPING COMP CLUSTERS

This application is a national stage entry of PCT Application No. PCT/EP2012/058345, filed on May 7, 2012, entitled "JOINT ASSIGNMENT AND SCHEDULING FOR OVERLAPPING COMP CLUSTERS", which is hereby incorporated by reference in its entirety.

FIELD OF THE INVENTION

The present invention relates to joint assignment and scheduling for overlapping coordinated multi-point transmission (CoMP) clusters. Generally, the present invention relates to the field of cellular mobile radio deployments with cooperative base stations. The particular area of interest is to introduce a scheduling method, that benefits from the new degree of freedom introduced by overlapping cooperation areas (CAs), for example in LTE networks and makes a joint CA assignment & resource scheduling possible.

BACKGROUND OF THE INVENTION

Documents [1], [2] describe the benefits of overlapping cooperation areas. Simulations are indicating strong performance improvements and as already discussed in document [3], it is an open issue how to schedule the user equipment (UE) to the best suited CA, if several CAs are candidates for that UE.

Figure 1:
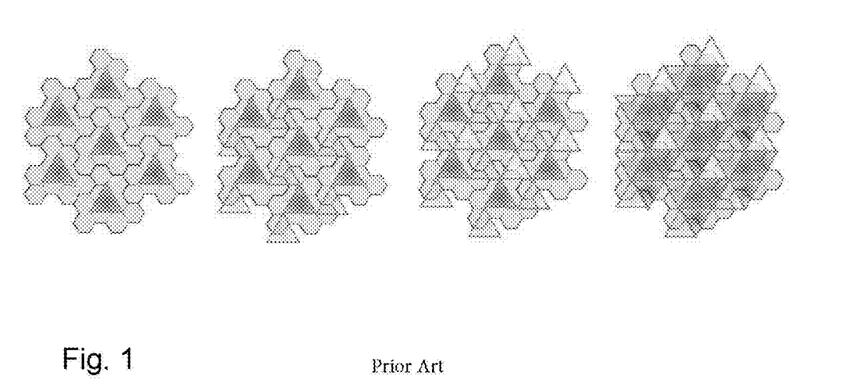
FIG. 1 is a diagram illustrating an example of a scenario with multiple (shifted) cooperation areas patterns.

A scenario is assumed with multiple (shifted) cooperation areas patterns (hereinafter referred to as 'cover shifts') that overlap each other, as illustrated in FIG. 1. The cooperation areas within the same cover shifts are non overlapping. In FIG. 1, each gray-scale represents a cover shift. Always three sectors contribute to a cooperation area.

In the example shown in FIG. 1, with five CA-shifts, all possible borders between two adjacent CAs (existing of three cell sites) can be covered by a different sub-band. In FIG. 1, all three contributing sites of a CA are connected with a triangle. The center area is shaded corresponding to the sub-band used by this CA. Since all cells are members of all shifts, the system is a so-called reuse one system.

Figure 2:
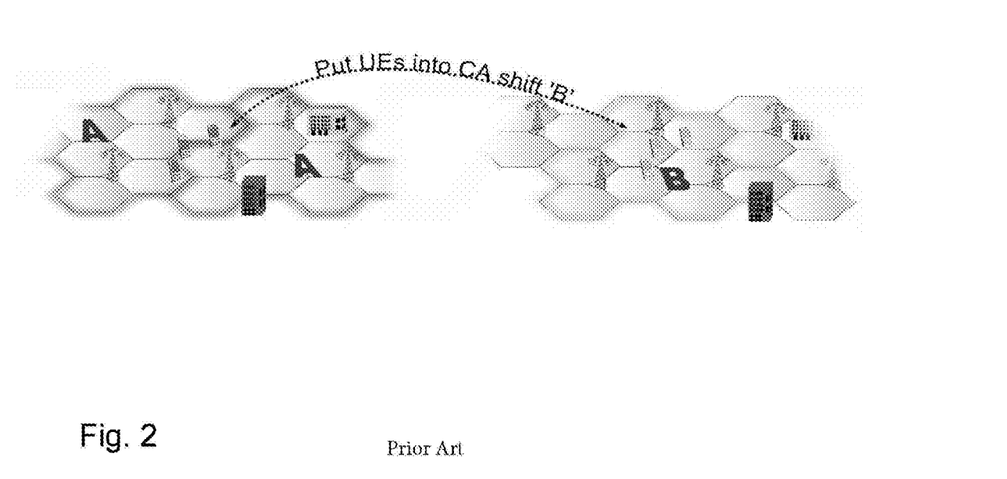
FIG. 2 is a diagram illustrating scheduling of UEs between different cover shifts.

The principle benefit of the cover shift is shown in FIG. 2. UEs at the border between two non overlapping CAs of the same shift (here: Shift 'A') are considered. These three illustrated UEs can be served as CA-edge-UEs by one of both CAs in cover shift 'A'. Further, they can be served as CA-center-UEs in a CA of cover shift 'B'. Each cover shift uses its own part of the system's resources, i.e. a certain frequency block, timeslot, etc. These segregations are creating an orthogonality and subsequently there is no interference between different cover shifts.

Each cover shift must have enough resources to serve all of its assigned UEs. The UEs in turn should be connected to the CA that contains at least their strongest, for example, three eNBs regarding the wideband radio channel connectivity according to the ideas presented in documents [1], [2], and [4]. However, it is noted here that three is only an example and any other suitable number of strongest eNBs could be used. In the following examples, the orthogonalization between cover shifts is described by using different sub-bands from a given system bandwidth. I.e. in FIG. 2, the cover shift A and the cover shift B are using different non-overlapping sub-bands of the system bandwidth.

As described in documents [1], [2] and [3], a clustering is assumed, where three adjacent cell sites cooperate, each cell site has three cells (120° sectors), which leads to 9 cell cooperation areas. The UE is conducting measurements and does a ranking of the measured cells according to the measured performance indicators (e.g. RSRP) and for cooperation it selects the 3 strongest cells. The N=3 strongest cells can concern to one, two, or three different cell sites. Due to an overlapping CA clustering as shown in FIG. 1, each cell site is a member of six different CAs. Two adjacent cell sites belong to two different CAs and three adjacent cell sites define exactly one CA.

Figure 3:
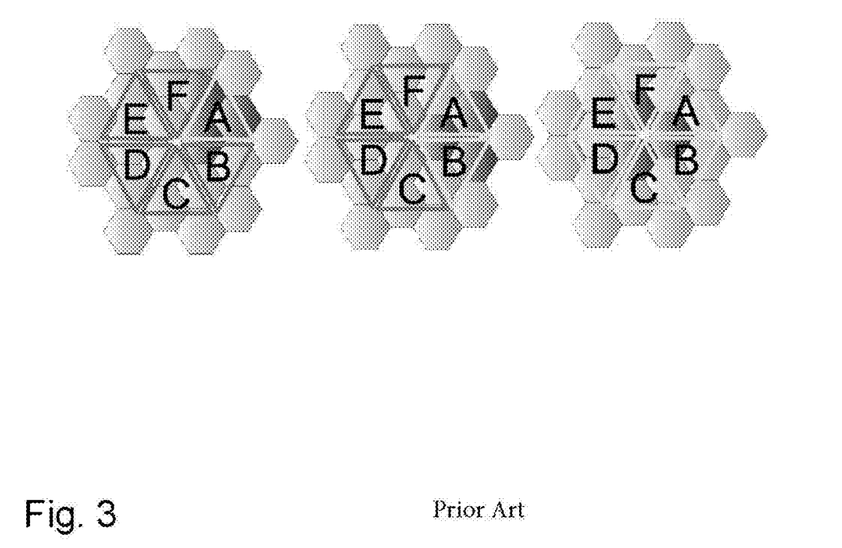
FIG. 3 is a diagram illustrating an example of a set of three different adjacent cells contained in different CA shifts.

Thus, depending of the distribution of its three strongest cells, each UE can be assigned to one, two, or even three different CAs. FIG. 3 shows an example of such cases. According to FIG. 3, CAs existing of nine cells, organized in three adjacent cell sites area assumed. Hence, the concept of shifted CAs results in six different shifts, marked as triangles with edges at the three cooperating cell sites in FIG. 3. There, three dark colored adjacent cells as assumed to be the strongest ones of an UE. As shown in FIG. 3, a set of three adjacent cells can be contained in one, two or all six different CA shifts.

The problem to be solved is an assignment and scheduling problem.

Namely, how to do the assignment of UEs and the sub-bands to CAs such that:
1. each CA has enough bandwidth to serve the assigned UEs, and
2. each UE is allocated to the optimum CA.

Due to the overlapping CAs, there are more possibilities for each UE to be assigned to. If additionally, the different CAs use different sub-bands, the assignment and scheduling should not be done by two independent processes.

In conventional solutions, each cell (i.e., each nodeB) has its own frequency resources that are not reused in adjacent cells, like in GSM. In reuse one scenarios like UMTS, each cell uses the full spectrum, but suffers from inter cell interference especially at the cell borders.

Fixed clustered cooperation areas (CAs) avoid interference between cooperating cells, but between two adjacent CAs, the problem is still present, i.e. an UE at CA borders suffers on inter CA interference.

The only possibility is to choose the best suited resource blocks for each UE, where best suited means that it suffers not too strong from inter cell interference. Thus, scheduling can only utilize frequency selective fading to mitigate the influence of inter cell interference, after the UEs being assigned to the nodeBs. This yields to poor performance since often strong interferers in adjacent CAs degrade the Signal to Interference Ratio (SIR).

PRIOR ART DOCUMENTS

Document [1]: "Wolfgang Mennerich and Wolfgang Zirwas. Implementation Issues of the Partial CoMP Concept. In Proceedings of 21st Annual IEEE International Symposium on Personal, Indoor and Mobile Radio Communications (PIMRC 2010), Istanbul, Turkey, September 2010".

Document [2]: "Wolfgang Mennerich and Wolfgang Zirwas. User Centric Coordinated Multi Point Transmission. In Proceedings of IEEE 72nd Vehicular Technology Conference (VTC2010-Fall), Ottawa, Canada, September 2010".

Document [3]: "Wolfgang Mennerich and Wolfgang Zirwas. User Centric Scheduling in Cooperative Networks. In Proceedings of IEEE Middle East Conference on Antennas and Propagation (MECAP 2010), Cairo, Egypt, September 2010".

Document [4]: WO2011/054380, W. Mennerich, W. Zirwas, "Method and device for determining a cooperation area".

SUMMARY OF THE INVENTION

According to the present invention, there are provided methods, apparatuses and a computer program product related to joint assignment and scheduling for overlapping coordinated multi-point transmission (CoMP) clusters.

According to an aspect of the invention there is provided a method, comprising:

acquiring, at a network entity, for each of a plurality of user equipments connected to a resource of a cooperation area, a connectivity ratio of each user equipment to the resource, selecting, at the network entity, among the plurality of user equipments connected to the resource of a cooperation area, a first user equipment having a lowest current connectivity ratio, and determining whether the current connectivity ratio of the selected user equipment is equal to or smaller than a stored connectivity ratio of the selected user equipment to another resource available for the user equipment.

According to further refinements as defined under the above aspect, the method further comprises:

if the current connectivity ratio is equal to or smaller than the stored connectivity ratio of the selected user equipment to the another resource, calculating connectivity ratios of all user equipments connected to the another resource and, determining whether there is a second user equipment having a lower connectivity ratio to the another resource than the first user equipment.

According to further refinements as defined under the above aspect, the method further comprises:

if it is determined that there is at least one second user equipment having a lower connectivity ratio to the another resource than the first user equipment, connecting the first user equipment to the selected resource.

According to further refinements as defined under the above aspect, the resource is a set of resource blocks of the cooperation area that are needed for a requested data rate of the user equipment;

the connectivity ratio is a group quality indicator ratio, GQIR, and the n-th group quality indicator ratio is calculated as:

GQIR(*n*)=(GQI(*n*)*GQI(*n*))/GQI(*n*+1), wherein GQI is a group quality indicator indicating channel quality;

the group quality indicator, GQI, is a sum of channel quality indicators;

the group quality indicator is a sum of connectivities of all cooperation cells on a certain resource normalized with the number of cells in the cooperation area;

the group quality indicator takes into account a user load indicator wherein a higher user load indicator causes a lower group quality indicator.

According to another aspect of the present invention, there is provided a network entity comprising:

an acquiring unit configured to acquire, for each of a plurality of user equipments connected to a resource of a cooperation area, a connectivity ratio of each user equipment to the resource, a selecting unit configured to select, among the plurality of user equipments connected to the resource of a cooperation area, a first user equipment having a lowest current connectivity ratio, and a determining unit configured to determine whether the current connectivity ratio of the selected user equipment is equal to or smaller than a stored connectivity ratio of the selected user equipment to another resource available for the user equipment.

According to further refinements as defined under the above aspect, the network entity further comprises:

a calculating unit configured to calculate, if the current connectivity ratio is equal to or smaller than the stored connectivity ratio of the selected user equipment to the another resource, connectivity ratios of all user equipments connected to the another resource, wherein the determining unit is further configured to determine whether there is a second user equipment having a lower connectivity ratio to the another resource than the first user equipment.

According to further refinements as defined under the above aspect, the network entity further comprises:

a unit configured to, if it is determined that there is at least one second user equipment having a lower connectivity ratio to the another resource than the first user equipment, cause the first user equipment to be connected to the selected resource.

According to further refinements as defined under the above aspect the resource is a set of resource blocks of the cooperation area that are needed for a requested data rate of the user equipment;

the connectivity ratio is a group quality indicator ratio, GQIR, and the n-th group quality indicator ratio is calculated as:

GQIR(*n*)=(GQI(*n*)*GQI(*n*))/GQI(*n*+1), wherein GQI is a group quality indicator indicating channel quality;

the group quality indicator, GQI, is a sum of channel quality indicators;

the group quality indicator is a sum of connectivities of all cooperation cells on a certain resource normalized with the number of cells in the cooperation area;

the group quality indicator takes into account a user load indicator wherein a higher user load indicator causes a lower group quality indicator.

According to another aspect of the present invention, there is provided a network entity comprising:

means for acquiring, for each of a plurality of user equipments connected to a resource of a cooperation area, a connectivity ratio of each user equipment to the resource, means for selecting, among the plurality of user equipments connected to the resource of a cooperation area, a first user equipment having a lowest current connectivity ratio, and means for determining whether the current connectivity ratio of the selected user equipment is equal to or smaller than a stored connectivity ratio of the selected user equipment to another resource available for the user equipment.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION

In the following, embodiments of the present invention are described by referring to general and specific examples of the embodiments. It is to be understood, however, that the description is given by way of example only, and that the described embodiments are by no means to be understood as limiting the present invention thereto.

According to the present invention, the presented scheduling is a new solution for assignment and scheduling, which utilizes the degrees of freedom, given in particular by the concept of overlapping coordinated multipoint (CoMP) clustering. The idea of the present invention is to bundle subcarriers with the cooperation areas where they are used.

The proposed joint assignment and scheduling (JAS) concept takes various parameters into account, for example, pathloss and (frequency selective) fading in radio channels of multiple cooperating nodeBs. A serving CA shall contain the cells that the UE sees as the strongest ones. These criteria may be valid for multiple of the overlapping CAs which are considered as the "candidates" for an UE's serving CA. That is, the UE can be allocated to different CAs, which increases the degree of freedom for the scheduler, and allows for further optimizations like a load balancing between the CAs.

These "candidates" are referred to as candidate serving CA (CSCA). Therefore, the presented invention utilizes the concept of overlapping CoMP scenarios as described in documents [1] to [4] mentioned above.

According to embodiments of the present invention, the concept of CAs and in particular overlapping CAs is combined with the sub-band characteristically fading profile which is specific for each CA, under the assumption of an individual sub-band allocation per CA.

Since the CSCAs will use different frequency sub-bands out of the given system bandwidth to remove the CA border interference, they have a sub-band specific selective fading. Thus, the sub-bands are additionally associated with a certain CA.

As a variant of the embodiments of the present invention CAs may be combined with overlapping frequency usage. In that case, the sub-bands can be used by different CAs in same time, when the interference situation allows such a usage.

This idea might also be utilized for LTE advanced, where the carrier aggregation feature allows that the system bandwidth need not span over a continuous frequency band.

According to certain embodiments of the present invention, the Group Quality Index (GQI) is a new quality measure assigned to a certain sub-band (composed by a group of physical resource blocks) and a certain group of cooperating cells (CA). So the GQI constitutes a connectivity measure of UEs which takes into account assignment resources (CAs) and scheduling resources (physical resource blocks in the sub-band or sub-bands associated with a CA). Evaluating the GQI allows therefore for a joint assignment and scheduling of a resource (specified by its assignment resource and its scheduling resources) for which the GQI has been determined. The conventional Channel Quality Indicator in LTE (CQI) corresponds to a single connection on a certain (but variable) number of frequencies. In contrast, the GQI corresponds to a group of connections on a certain (also variable) number of frequencies. In the case of overlapping CAs, a single connection between a certain network side antenna base (e.g. "point" in LTE-A) and an UE can be contained in multiple CAs. If additional the used sub-bands of the CAs overlap each other, also a sub-band might correspond to multiple GQIs (caused by multiple CAs that use that sub-band at the same time).

Thus, the GQI can be seen as the evolution of the CQI, taking cooperation between multiple transceiving points on the network side into account. The connection between a certain access point and an UE can be contained in multiple GQIs—each with a different set of cooperating access points.

The joint assignment and scheduling requires a central unit, having detailed channel knowledge about the UEs to be assigned and scheduled. The channel quality is calculated between all UEs and all of their "Candidates of Serving CA" (CSCAs) which might use different frequency sub-bands. To be a CSCA, the CA must contain at least the K network wide strongest cells, wherein, e.g., K=3.

As aforementioned, the new "Group Quality Indicator" (GQI) is similar to the channel quality indication (CQI) definition of a cell, but is now related to cooperation areas, instead to single cells. It represents a computed channel quality value of radio channels concerning to the cells in a cooperation area, using the physical resource blocks of a sub-band. It is calculated by just summarizing the connectivity of all cooperating cells on a certain physical resource block and normalizing this sum with the number of cells in that CA.

Two initializations must be done for all UEs to calculate the GQIs and ratios between them, the so called GQIRs:

The GQI corresponds to the connectivity of a set of physical resource blocks for a single UE from a certain CSCA. For example, CQI values might be used for that. Typically, more physical resource blocks than needed for a single UE are available at a CSCA. Then, multiple GQIs per CSCA are defined with one GQI covering a set of resource blocks that are needed for the requested data rate of the UE. Each UE is preferably served by the resource corresponding to a single GQI to avoid that an UE needs the resources of multiple GQIs as different GQIs can correspond to different CAs and each UE must be served by a single CA.

In this regard, a subcarrier window with the minimum number of subcarriers (as requested by the UE's demands) can be formed and this window can be "swept" through all subcarriers of a CA, one by one. Then, there would be as nearly as much GQI values as subcarriers available per CA (subtract the number of needed subcarriers) with a granularity of one subcarrier. The effort for evaluating the GQI values can of course be reduced by choosing a coarser granularity along the frequency axis.

Additionally, a load indicator is included into the GQI such that a higher user load on the resources corresponding to a certain GQI causes a lower GQI value. All GQIs from all CSCAs are sorted in a decreasing order, i.e. GQI(1)>GQI(2)> . . . >GQI(N).

Then, Group Quality Indicator Index Ratios (GQIRs) are calculated:

The n-th GQI-ratio GQIR(n) is defined as:

$$GQIR(n)=(GQI(n)*GQI(n))/GQI(n+1)$$

Thus, the n-th GQIR increases with the GQI-loss for an UE if it is served from the resources and the CA corresponding to GQI(R)(n+1) instead of GQI(n). The absolute GQI value is taken into account by the squared value of GQI(n) in the numerator of the GQIR to care about the load on the resources corresponding to a certain GQI.

When the above mentioned lists for all UEs are compiled and the current GQIR (cGQIR) of each UE is calculated, the central unit can start with joint assignment and scheduling.

A central unit cares for as much CAS as needed to be able to offer all resource blocks of the system.

The algorithm selects the UE with lowest current GQI (cGQI) and checks whether this UE can be connected with an GQI higher than the current one. If this is not the case, the algorithm selects the next UE.

If there is a GQIR, higher than the UE's current one possible, it is checked whether within the UEs served by the corresponding resources (i.e. a CA on a certain group of resource blocks) there is at least one UE with a cGQIR similar to the aimed GQIR of the UE being scheduled at the moment. This method makes sure that an UE which could be connected to alternative resources with similar connectivity gives its place to another UE which has not such good alternatives. Note that the GQIR corresponds to a kind of worthiness of an UE's connection: First, there is a high GQIR due to a small denominator, which means that this UE has only a bad alternative connection if it must leave its current serving CA. Second, big GQI values yield to high GQIR values. Both influences reflect the importance of good connections, especially, if an UE has no similar alternatives.

A new UE will start with a current GQIR (cGQIR) of an initial value, e.g. zero. Thus, in this first step all CAs look suitable for the UE. It is noted that with an increasing number of executed measurement loops, the GQIRs start to differ.

UEs not yet having established a radio bearer, will request to connect to the CA providing the best GCQI. The measurements of GCQI of other CA is continued whilst connected, and the best serving CA choice is permanently checked.

The UE can be scheduled to CA or a frequency block with an GQIR higher than the current one, and if there is a proof that no dead lock loop is entered (i.e. scheduling e.g. two UEs forward and back between two CAs), the UE will be disconnected from its current resources and connected to its new resources (which might also be the same CA, but another frequency block).

Since the GQI's depend also on the load of the resources, this issue is automatically taken into account from the algorithm, because the GQI's decrease if the load on their resources increases.

Figure 4:
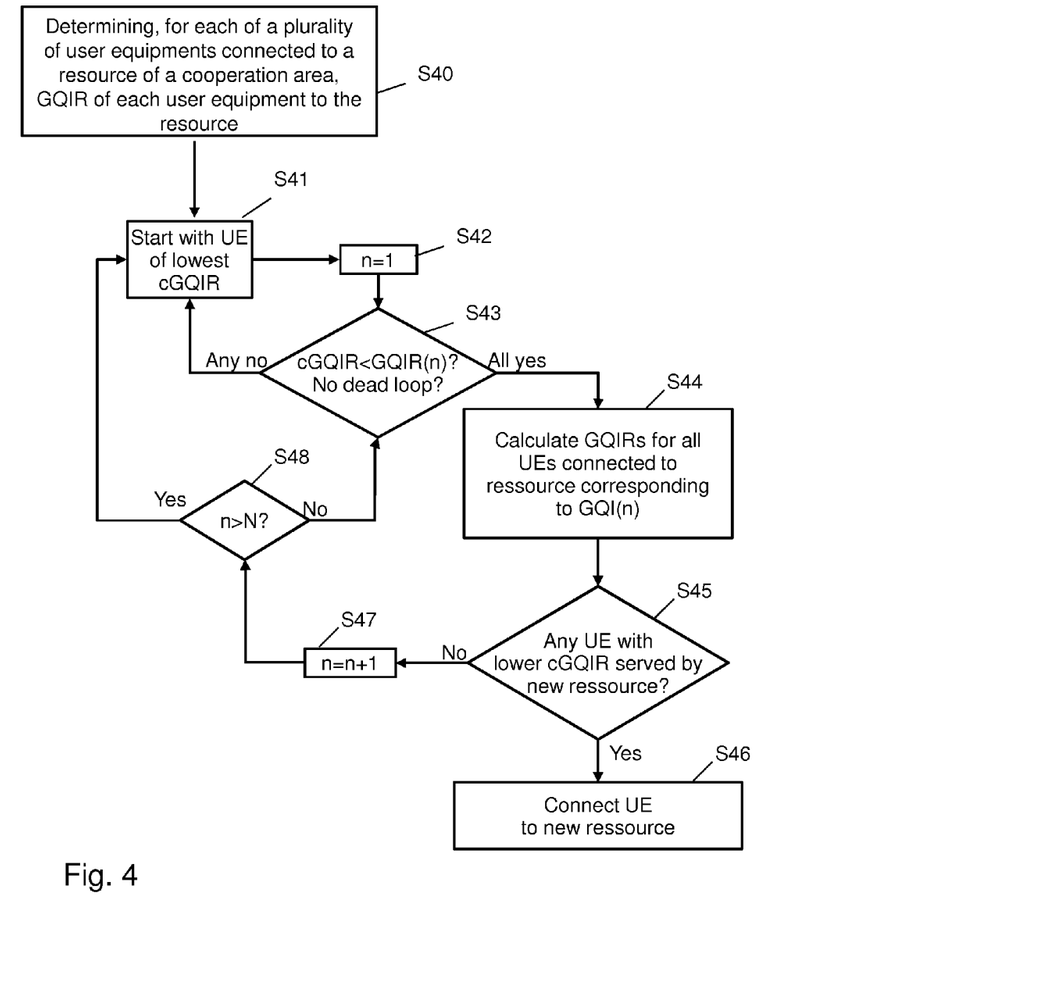
FIG. 4 is a flow chart illustrating processing at a network entity according to an embodiment of the present invention.

FIG. 4 is a flow chart illustrating the processing at the central unit, i.e. the network entity, according to an embodiment of the present invention.

First, in a step S40, the central unit determines for each of a plurality of user equipments connected to a resource of a cooperation area, a connectivity ratio, i.e. GQIR, of each user equipment to the resource. Then, in a step S41, the central unit selects the UE which has the lowest current GQIR (cGQIR) among the UEs connected to a certain CA, and in a step S42, n is set to 1, wherein n indicates the resource. Then, in a step S43, it is determined whether the cGQIR of the UE is smaller than GQIR(n) and whether the UE is not in a dead loop. If any of these determinations is negative (NO is step S43), the process returns to step S41.

Otherwise, if all of the above determinations are positive (YES in step S43), i.e. if the GQIR(n) is larger than the cGQIR of the UE, which means that the connectivity of the UE to a new resource corresponding to GQI(n) is better than the connectivity of the UE to the resource to which it is currently connected, in step S44, GQIRs for all UEs connected to the new resource corresponding to the GQI(n) are calculated. Then, in step S45, it is determined whether a UE, which has a lower cGQIR than the selected UE, is served by this new resource.

If it is determined in step S45, that there is at least one UE with a lower cGQIR (YES is step S47), then the process proceeds to step S46 in which the UE is connected to the new resource. Otherwise, if it is determined in step S45 that there is no UE with a lower cGQIR (NO in step S45), the process proceeds to step S47 in which n is incremented by 1. Then, it is checked in step S48, whether n is larger than N, which is the total number of resources, i.e. whether the process has been executed for all resources.

If it is determined in step S48 that n is larger than N, i.e. that the process has been executed for all resources (YES in step S48), the process returns to step S41. Otherwise, if it is determined that N is equal to or smaller than N, i.e. that the process has not been executed for all resources (NO is step S48), the process returns to step S43 and similar processing as described above is repeated.

Figure 5:
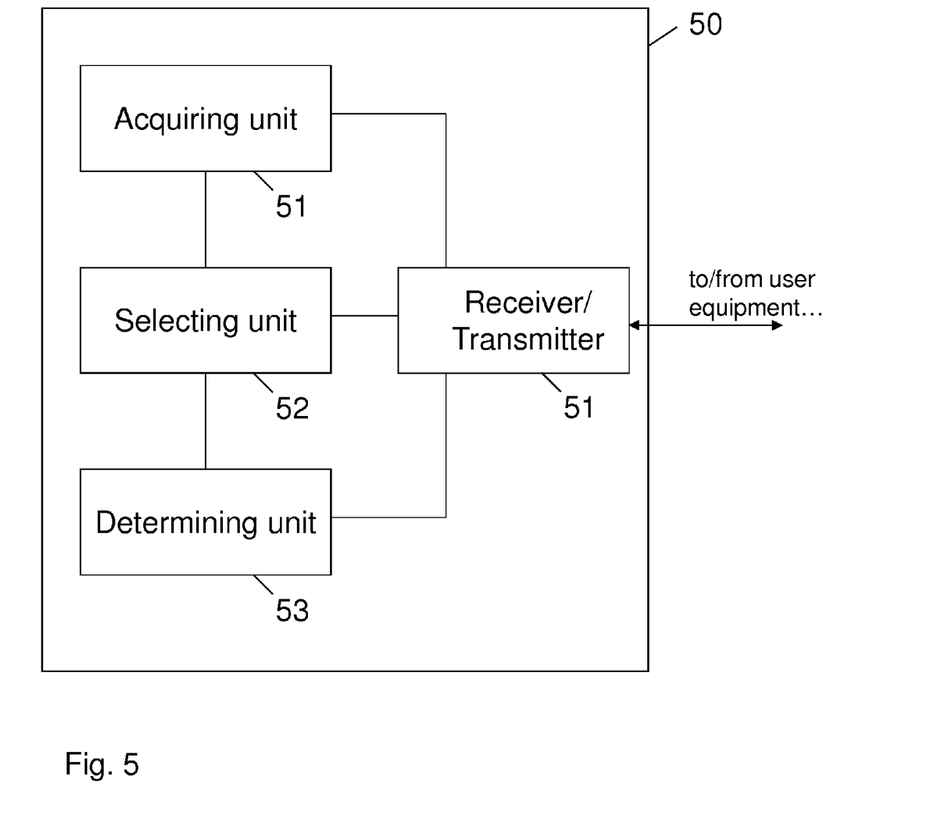
FIG. 5 is a block diagram showing an example of a network entity according to certain embodiments of the present invention.

FIG. 5 is a block diagram showing an example of a network entity as an apparatus according to certain embodiments of the present invention.

As shown in FIG. 5, according to an embodiment of the present invention, the network entity 50 comprises a transmitter/receiver 31, an acquiring unit 52, a selecting unit 53 and a determining unit 54. The transmitter/receiver 51 enables the network entity to communicate with the user equipments or any other network element, like e.g. base stations or control elements.

The acquiring unit 52 acquires for each of a plurality of user equipments connected to a resource of a cooperation area, a connectivity ratio of each user equipment to the resource. Then, the selecting unit 53 selects, among the plurality of user equipments connected to the resource of a cooperation area, a first user equipment having a lowest current connectivity ratio, and the determining unit 54 determines whether the current connectivity ratio of the selected user equipment is equal to or smaller than a stored connectivity ratio of the selected user equipment to another resource available for the user equipment.

Further, the network entity further comprises a calculating unit (not shown) for calculating, if the current connectivity ratio is equal to or smaller than the stored connectivity ratio of the selected user equipment to the another resource, connectivity ratios of all user equipments connected to the another resource. Then, the determining unit 54 determines whether there is a second user equipment having a lower connectivity ratio to the another resource than the first user equipment.

Moreover, if it is determined that there is at least one second user equipment having a lower connectivity ratio to the another resource than the first user equipment, the network entity causes the first user equipment to be connected to the selected resource.

According to certain embodiment of the present invention as described above, the resource is a set of resource blocks of the cooperation area that are needed for a requested data rate of the user equipment.

According to certain embodiment of the present invention as described above, the connectivity ratio is a group quality indicator ratio, GQIR, and the n-th group quality indicator ratio is calculated as:

$$GQIR(n)=(GQI(n)*GQI(n))/GQI(n+1),$$

wherein GQI is a group quality indicator indicating channel quality.

According to certain embodiment of the present invention as described above, the group quality indicator, GQI, is a sum of channel quality indicators.

According to certain embodiment of the present invention as described above, the group quality indicator is a sum of connectivities of all cooperation cells on a certain resource normalized with the number of cells in the cooperation area.

According to certain embodiment of the present invention as described above, the group quality indicator takes into account a user load indicator wherein a higher user load indicator causes a lower group quality indicator.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. the network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus. i.e. the network entity, to perform at least the thus mentioned function. Also, such function is to be construed to be equivalently implementable by specifically configured circuitry or means for performing the respective function (i.e. the expression "unit configured to" is construed to be equivalent to an expression such as "means for").

According to certain embodiments of the invention, the following advantages can be achieved.

The comparison using the GQIRs finds out whether a new UE should be added to an existing group of UEs being served jointly by a certain CA at certain resources. If in that group of UEs there is at least one with a lower GQIR than the requesting UE, waste of system resources is less if the new UE connects because in the next steps, the following will happen:

Due to the increased load on the CA, all GQIRs of its connected UEs will decrease;

The UE with the lowest GQIR will be the first one that is selected to be re-scheduled to another CA and this UE will be another one than that one which has joint the CA as the last one. (Due to the GQIR comparison);

During that ongoing process, UEs find the best resources without alternatives.

Hence, according to certain embodiments of the present invention, the new degree of freedom of joint scheduling and assignment is utilized.

For the purpose of the present invention as described herein above, it should be noted that method steps likely to be implemented as software code portions and being run using a processor at a network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method for scheduling a user equipment to a best suited resource of a cooperation area, comprising:
   acquiring, at a network entity, for each of a plurality of user equipments connected to a resource of a cooperation area, a connectivity ratio of each user equipment to the resource,
   selecting, at the network entity, among the plurality of user equipments connected to the resource of a cooperation area, a first user equipment having a lowest current connectivity ratio,
   determining whether the current connectivity ratio of the selected user equipment is equal to or smaller than a stored connectivity ratio of the selected user equipment to another resource available for the user equipment,
   if the current connectivity ratio is equal to or smaller than the stored connectivity ratio of the selected user equipment to the another resource,
      calculating connectivity ratios of all user equipments connected to the another resource, and
      determining whether there is a second user equipment having a lower connectivity ratio to the another resource than the first user equipment, and
   if it is determined that there is at least one second user equipment having a lower connectivity ratio to the another resource than the first user equipment,
      connecting the first user equipment to the selected resource.

2. The method according to claim 1, wherein:
   the resource is a set of resource blocks of the cooperation area that are needed for a requested data rate of the user equipment.

3. The method according to claim 1, wherein:
   the connectivity ratio is a group quality indicator ratio, GQIR, and the n-th group quality indicator ratio is calculated as:

$GQIR(n)=(GQI(n)*GQI(n))/GQI(n+1)$, wherein GQI is a group quality indicator indicating channel quality.

4. The method according to claim 1, wherein:
   the connectivity ratio comprises a sum of channel quality indicators.

5. The method according to claim 1, wherein the connectivity ratio comprises a sum of connectivities of all cooperation cells on a certain resource normalized with the number of cells in the cooperation area.

6. The method according to claim 1, wherein:
   the connectivity ratio takes into account a user load indicator wherein a higher user load indicator causes a lower connectivity ratio.

7. The method according to claim 1, wherein the connectivity ratio is a group quality indicator ratio indicating channel quality.

8. A computer program product comprising a non-transitory computer-readable storage medium bearing computer program code embodied therein for use with a computer, the computer program code comprising code for performing the method of claim 1.

9. An apparatus configured to schedule a user equipment to a best suited resource of a cooperation area comprising:
   at least one processor; and
   at least on memory including computer program, the at least one memory and the computer program code configured, with the at least one processor, to cause the apparatus to perform at least the following:
   acquire, for each of a plurality of user equipments connected to a resource of a cooperation area, a connectivity ratio of each user equipment to the resource,
   select, among the plurality of user equipments connected to the resource of a cooperation area, a first user equipment having a lowest current connectivity ratio,
   determine whether the current connectivity ratio of the selected user equipment is equal to or smaller than a stored connectivity ratio of the selected user equipment to another resource available for the user equipment,
   calculate, if the current connectivity ratio is equal to or smaller than the stored connectivity ratio of the selected user equipment to the another resource, connectivity ratios of all user equipments connected to the another resource,
   determine whether there is a second user equipment having a lower connectivity ratio to the another resource than the first user equipment, and
   if it is determined that there is at least one second user equipment having a lower connectivity ratio to the another resource than the first user equipment, to cause the first user equipment to be connected to the selected resource.

10. The apparatus according to claim 9, wherein:
    the resource is a set of resource blocks of the cooperation area that are needed for a requested data rate of the user equipment.

11. The apparatus according to claim 9, wherein:
    the connectivity ratio is a group quality indicator ratio, GQIR, and the n-th group quality indicator ratio is calculated as:

$GQIR(n)=(GQI(n)*GQI(n))/GQI(n+1)$, wherein GQI is a group quality indicator indicating channel quality.

12. The apparatus according to claim 9, wherein:
    the connectivity ratio comprises a sum of channel quality indicators.

13. The apparatus according to claim 9, wherein the connectivity ratio comprises a sum of connectivities of all cooperation cells on a certain resource normalized with the number of cells in the cooperation area.

14. The apparatus according to claim 9, wherein:
the connectivity ratio takes into account a user load indicator wherein a higher user load indicator causes a lower connectivity ratio.

15. The method according to claim 9, wherein the connectivity ratio is a group quality indicator ratio indicating channel quality.

16. An apparatus configured to schedule a user equipment to a best suited resource of a cooperation area comprising:
at least one processor; and
at least on memory including computer program, the at least one memory and the computer program code configured, with the at least one processor, to cause the apparatus to perform at least the following:

acquire, for each of a plurality of user equipments connected to a resource of a cooperation area, a connectivity ratio of each user equipment to the resource,
select, among the plurality of user equipments connected to the resource of a cooperation area, a first user equipment having a lowest current connectivity ratio,
determine whether the current connectivity ratio of the selected user equipment is equal to or smaller than a stored connectivity ratio of the selected user equipment to another resource available for the user equipment,
calculate connectivity ratios of one or more user equipments connected to the another resource, and
if there is at least one second user equipment having a lower connectivity ratio to the another resource than the first user equipment, to cause the first user equipment to be connected to the selected resource.

* * * * *

UNITED STATES PATENT AND TRADEMARK OFFICE
CERTIFICATE OF CORRECTION

PATENT NO. : 9,867,201 B2
APPLICATION NO. : 14/399462
DATED : January 9, 2018
INVENTOR(S) : Faerber et al.

It is certified that error appears in the above-identified patent and that said Letters Patent is hereby corrected as shown below:

On the Title Page

Column 2, item (56), under "OTHER PUBLICATIONS", Line 1, delete "al.; Main" and insert -- al.; "Main --, therefor.

Column 2, item (56), under "OTHER PUBLICATIONS", Line 2, delete "Mitigation;" and insert -- Mitigation"; --, therefor.

In the drawing, reference S44, Line 3, delete "ressource" and insert -- resource --, therefor.

In the drawing, reference S45, Line 3, delete "ressource?" and insert -- resource? --, therefor.

In the drawing, reference S46, Line 2, delete "ressource" and insert -- resource --, therefor.

On Page 2, Column 1, item (56), under "OTHER PUBLICATIONS", Line 10, delete "Instanbul," and insert -- Istanbul, --, therefor.

On Page 2, Column 1, item (56), under "OTHER PUBLICATIONS", Line 12, delete ""Usercentric" and insert -- "User Centric --, therefor.

In the Drawings

In Fig. 4, reference S44, Line 3, delete "ressource" and insert -- resource --, therefor.

In Fig. 4, reference S45, Line 3, delete "ressource?" and insert -- resource? --, therefor.

In Fig. 4, reference S46, Line 2, delete "ressource" and insert -- resource --, therefor.

Signed and Sealed this
Second Day of June, 2020

Andrei Iancu
*Director of the United States Patent and Trademark Office*

In the Claims

In Column 13, Line 9, Claim 15, delete "method" and insert -- apparatus --, therefor.